3,840,661
IODINE AND BROMINE ADDUCTS OF 1,3,5-TRI (β - HYDROXY) ETHYLHEXAHYDRO-s-TRIAZINE AND THE USE THEREOF AS A BACTERICIDE OR FUNGICIDE

David A. Waldstein, 622 Bergen Ave., Jersey City, N.J. 07305
No Drawing. Filed Feb. 28, 1972, Ser. No. 230,039
Int. Cl. A01n 9/22
U.S. Cl. 424—249          6 Claims

ABSTRACT OF THE DISCLOSURE

As a novel compound, an iodine or bromine adduct of 1,3,5-tri(β-hydroxy) ethylhexahydro-s-triazine, a method for making the same and the use thereof as a bactericide/fungicide in a carrier. The bactericide/fungicide function is for reducing or eliminating bacteria and/or fungi in a carrier which is to be applied to an object, for example, solid or liquid soap or a disinfectant, and for reducing or eliminating the side effects of bacterial and/or fungal growth where the carrier has a non-bactericidal/fungicidal major function, for example, liquid media such as a cutting oil, a hydraulic fluid, a varnish, an adhesive, or a paper coating, or where the carrier is a paint.

BACKGROUND OF THE INVENTION

1. Field of the Invention

Triazine halogen adducts, their method of manufacture, and bactericidal/fungicidal compositions of matter containing the same.

2. Description of the Prior Art

There are presently available a large number of compounds that have been proposed and have been used for their bactericidal and/or fungicidal action. Their field of use is extremely wide. Bactericides and/or fungicides have been incorporated in a multitude of compositions of matter primarily for three purposes, the first being to prevent deterioration of the composition due to bacterial/fungal attack between the time that the composition is made and the time that the composition is used, the second being to inhibit bacterial attack on the composition after the composition has been applied to an object, and the third being to inhibit bacterial attack of an object to which the composition is applied.

Typical of the first use are cutting oils, grinding oils, penetrating oils, drawing oils, iron tinning oils, core oils, and hydraulic oils. These are known to be subject to bacterial and/or fungal attack which degrades the physical characteristics and efficacy of the oils. The different kinds of bacteria and fungi and the nature of their attack on these oils are so well known and so thoroughly documented that it is unnecessary to iterate such state of the art in this application. Typical patents which deal with the action of bacteria on various industrial oils and the use of bactericides and/or fungicides therein are U.S.L.P. Nos. 2,976,244; 2,987,479; 3,013,973 and 3,033,785.

Typical of the second use are paints, for example, water-base emulsion paints such as acrylic paints, vinyl paints, rubber latex paints and alkyd paints, and oil-base paints such, for example, as linseed oil paint and also varnishes, adhesives and paper coatings.

Typical of the third use are household disinfectants, liquid soaps and solid soaps, e.g. bar soap, soap beads and soap flakes.

The problems with different bactericides and fungicides are many. For example, some are too expensive for widespread commercial use, some are toxic or create nausea or alimentary irritation if ingested and therefore are considered unsafe for general purpose use in households where children may be present, some are irritating to the skin both when applied to the skin in the compositions of matter in which they are incorporated or when touched by a person after the composition has been applied to an object and is present only in a residue, some have an initial good bacteriostatic and/or fungicidal efficiency but tend to become less effective over a period of time due either to the acquisition of a tolerance by different strains and types of bacteria and/or fungi or to the development of a variant strain which will flourish upon the suppression of other types of strains of bacteria and/or fungi, some have a low degree of efficiency and must be used in unduly high concentrations, some have a rather restricted action spectrum, and others have too slow a speed of action.

Among the large number of bactericides and/or fungicides available, and which are so well known to the art that they will not be repeated here, is one compound which has been proposed as a bactericide and which is believed to be the compound chemically closest to the bactericide/fungicide of the present invention. This is 1,3,5-tri(β-hydroxy) ethylhexahydro-s-triazine. However 1,3,5-tri(β-hydroxy) ethylhexahydro-s-triazine is subject to many of the aforementioned defects. Thus, it does not have a desirably wide spectrum of bacteriostatic action, its bacteriostatic action deteriorates over extended periods of time due, it is thought, to either the aforementioned tolerance or the development of variant strains of bacteria, it does not have a highly rapid bacteriostatic rate and it has caused outbreaks of dermatitis.

SUMMARY OF THE INVENTION

1. Purposes of the Invention

It is an object of the invention to provide a novel chemical compound constituting an iodine or bromine adduct of 1,3,5-tri(β-hydroxy) ethylhexahydro-s-triazine and a method of making the same.

It is another object of the invention to provide a novel bactericide/fungicide which is not subject to the enumerated and other defects of the prior art.

It is another object of the invention to provide a composition embodying the aforesaid novel bactericide/fungicide composition and which includes said bactericide/fungicide in a bacterial/fungal-inhibiting amount in a carrier, the carrier optionally having a function other than that simply of a diluent or carrier for the bactericide/fungicide, that is to say, optionally serving some major functional purpose other than a bacteriostatic and/or fungicidal one.

It is another object of the invention to provide a novel bactericide/fungicide which is inexpensive to make, which is easy to incorporate in a carrier, which is non-toxic either upon application to the skin or upon ingestion and, even upon ingestion, will not create nausea or alimentary irritation, which is non-irritating to the skin and will not induce dermatitis, which has an excellent, quick and enduring bacteriostatic/fungicidal action, which is effective in low concentrations, and which has a broad action spectrum.

Other objects of the invention in part will be obvious and in part will be pointed out hereinafter.

2. Brief Description of the Invention

The present invention resides in a specific limited class of compounds, particularly the iodine and bromine adducts of 1,3,5-tri(β-hydroxy) ethylhexahydro-s-triazine.

These have the formula

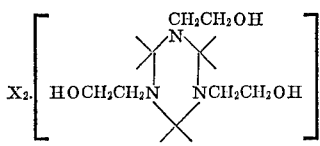

where X is iodine or bromine.

These adducts are reaction products of 1,3,5-tri(β-hydroxy) ethylhexahydro-s-triazine with iodine or bromine wherein the iodine or bromine is present in from about 1% to 100% by gram molecular weight of the triazine, the reaction taking place at between about 30° C. to about 80° C. at atmospheric pressure with agitation and, optionally, cooling so as not to exceed the higher temperature inasmuch as the reaction is exothermic. The reaction is carried out to completion in that all the iodine or bromine up to the indicated amount is incorporated in the adduct, this being determined by the observation that where iodine is used the adduct will not yield a typical iodine-starch reaction or where bromine is used the addition of potassium iodide to a water solution of the reaction product will not displace bromine which becomes visible.

The reaction product is highly soluble in water, indeed, 95% water solutions thereof are prepared with no difficulty. The reaction product is also soluble in oils of all types, e.g. animal, mineral and vegetable. The novel triazine adduct is an excellent bactericide/fungicide and can be incorporated in all compositions in which the presence of a bactericide and/or fungicide is desirable, examples of such compositions being cutting oil, grinding oil, penetrating oil, drawing oil, iron tinning oil, core oil and hydraulic oil, varnishes, adhesives, paper coatings, water, liquid soaps, solid soaps, and water-base and oil-base paints.

The invention accordingly consists in compounds, compositions of matter employing the compounds, methods of using such compositions of matter and methods of making and using said compounds which are exemplified in the compounds, compositions and methods hereinafter described and of which the scope of application will be indicated in the appended claims.

DESCRIPTION OF THE PREFERRED EMBODIMENTS

The compound 1,3,5-tri(β-hydroxy) ethylhexahydro-s-triazine is well known, the same and its method of preparation being described on pages 486 and 488 of "s-Triazines and Derivatives," by Edwin M. Smolin and Lorence Rapoport, and published in 1959 by Interscience Publishers, Inc. of New York.

Pursuant to the present invention this specific triazine, which itself is not considered to be a satisfactory bactericide, is used as a starting material in the production of an iodine or bromine adduct thereof by reacting iodine or bromine with the triazine. The reaction products—the adducts—have been found to be useful as bactericides/fungicides (1) that have a wide spectrum of bactericide/fungicide action, (2) that can be made easily and inexpensively, (3) that can readily be incorporated in a composition of matter where they serve as bactericides/fungicides, (4) that are effective in low concentrations acting both against bacteria and fungi which would tend (a) to grow in the composition of matter, (b) to deteriorate the composition of matter, (c) to attack an object to which the composition of matter is applied, and (d) to attack the composition of matter after application to the object drying or setting thereof, (5) that are non-toxic and non-irritating topically or within the alimentary canal and (6) that are quick, long-lasting and effective in their bacteriostatic/fungicidal action.

To prepare the new bactericides/fungicides, 1,3,5-tri(β-hydroxy) ethylhexahydro-s-triazine is placed in a vessel that is open to the ambient air and hence is at atmospheric pressure. Then iodine or bromine, depending upon which adduct is desired in the final product, is added thereto with constant agitation which preferably is effected by stirring. The amount of iodine or bromine added may vary from about 1% to about 100% by gram molecular weight to the gram molecular weight of the triazine. In amounts below 1% the adduct contains insufficient iodine or bromine to be satisfactory as a bactericide/fungicide at low concentrations of the adduct. With more than 100% by gram molecular weight of the iodine or bromine added for a gram molecular weight of the triazine, free iodine or bromine will be present, i.e. the reaction cannot proceed to completion for all the iodine or bromine, and this has various undesirable side effects such as are known to be associated with the presence of free iodine or bromine.

Preferably, the reaction takes place between about 30° C. and about 80° C. Somewhat lower temperatures, e.g. down to about room temperatures, may prevail during the reaction, but it is not necessary to carry out the reaction at this lower temperature, firstly, because it proceeds too slowly, and secondly, because the reaction is exothermic and too much cooling may be required depending upon the rate of the reaction, it having been observed that the reaction is carried out satisfactorily in the temperature range indicated, i.e. from between about 30° C. to about 80° C., and the reaction product is not adversely affected within that range so that, generally speaking, the reaction may be affected within that temperature range by appropriately controlling the rate of the reaction by regulating the rate of addition of iodine or bromine to the triazine and by appropriate cooling means such as the use of a refrigerated vessel or the employment of refrigerated elements located within the vessel.

A typical satisfactory rate of addition for the iodine or bromine is about 0.1% per minute of the total weight of iodine or bromine required for the desired adduct. This rate of addition preferably should not exceed 0.25% of the total amount per minute. If desired, however, faster rates of addition may be employed up to, for example, as much as 1.50% of the total weight or iodine or bromine per minute. However, when these rapid rates of addition are employed, because the reaction is exothermic as noted previously, extensive cooling may be needed and, unless speed is a factor, it is preferred to use the lower rates of addition and simply allow radiative, conductive and convective natural heat dissipation to remove the thermal energy generated without exceeding the upper temperature range of about 80° C. A total reaction time is contemplated which will vary between about 70 minutes and about 16 hours.

Purely by way of example, a desired reaction product is obtained by adding 1.16 grams of iodine at a uniform rate to 100 grams of the aforesaid triazine in an open vessel at a rate such that the total addition of iodine is completed in 4 hours, the temperature being held to about 50° C. with stirring. The adduct thus obtained has a 1:100 gram molecular ratio of the iodine to the triazine. In another example, 0.73 grams of bromine are added to 100 grams of the said triazine under the same conditions and at the same rate. This adduct has a 1:100 gram molecular ratio of the bromine to the triazine. Pursuant to another example in which iodine is present in a 1:1 gram molecular ratio to the triazine in the adduct, 115.9 grams of iodine are added to 100 grams of the said triazine in an open vessel at a uniform rate over 6 hours at a temperature of about 70° C. with stirring. In still another example in which a 1:1 gram molecular ratio of bromine to the triazine is present, 73.06 grams of bromine are added over a period of 6 hours at a uniform rate to 100 grams of said trazine in an open vessel at a temperature of about 70° C. with stirring.

In all cases the reaction must be carried out to completion. Completion is determined, in the case of the iodine-triazine reaction product, by the absence of an iodine-starch reaction when the adduct is dissolved in water, thus indicating that no free iodine is present, all of the iodine having become bound in the reaction product. Where the bromine-triazine reaction product is formed, completion of the reaction can be tested by adding potassium iodide to the reaction product dissolved in water and visually ascertaining whether bromine is displaced by the iodine and can be seen as free bromine.

The iodine and bromine reaction products of 1,3,5-tri($\beta$-hydroxy) ethylhexahydro-s-triazine are characterized by their high degree of solubility in water and by their solubility in oils of various types, e.g. animal, mineral and vegetable oils, as well as their solubility in many organic solvents such, for example, as ethanol, methanol, propanol, and aliphatic and aromatic solvents generally such, for example as Shell Sol 71, manufactured by Shell Oil Company; Isopar H, Isopar K and Isopar L, manufactured by Humble Oil and Refining Company; Amsco OMS, Amsco 460 Solvent and Amsco Odorless Insecticide Base, manufactured by American Mineral Spirits Company; and odorless kerosene. Physical characteristics of Shell Sol 71, Isopar H, Isopar K, Isopar L, Amsco OMS, Amsco 460 Solvent and Amsco Odorless Insecticides Base which fingerprint these solvents are set forth below:

| | Distillation | | Flash pt., °F., TCC | K.B. No. | Aniline pt., °F. | Sp. gr., 60°/60° F. |
|---|---|---|---|---|---|---|
| | IBP,[1] °F. | Dry end pt., °F. | | | | |
| Shell Sol 71 | 345 | 398 | 121 | 26.5 | 183 | 0.7563 |
| Isopar H | 350 | 371 | 123 | 26.9 | 183 | 0.7571 |
| Isopar K | 349 | 383 | 126 | 26.5 | 185 | 0.7587 |
| Isopar L | 372 | 406 | 144 | | 187 | 0.7674 |
| Amsco OMS | 352 | 386 | 125 | 27.0 | 184.5 | 0.7608 |
| Amsco 460 Solvent | 375 | 456 | 150 | 34.5 | 146.5 | 0.8108 |
| Amsco Odorless Insecticide Base | 375 | 482 | 152 | 26.5 | 175.0 | 0.7711 |

[1] Initial boiling point ASTM D-1078.

and various others.

In some manufacturing processes the novel triazine adducts of bromine or iodine are added directly to a suitable carrier in a concentration sufficient to effect a bactericidal/fungicidal action, and in other manufacturing processes a said triazine adduct may first be dissolved in a suitable solvent, which will depend upon the process and/or the end product, and then added to the carrier as a manufacturing convenience. Conventional addenda also may and usually will be incorporated in the ensuing composition of matter as, for example, surfactants, rust inhibitors, cleansers, perfumes, masking agents, opacifying agents and coupling agents.

The novel bactericides/fungicides of the instant invention are effective upon a variety of bacteria and upon fungi. The following are typical of the types upon which said agents are useful as a bactericide or fungicide when present in a sufficient concentration as will be mentioned hereinafter:

Achromobacter sp.
Aerobacter sp., e.g. *Aerobacter aerogenes*
Alcaligenes sp.
Bacillus sp., e.g. *Bacillus cereus, Bacillus subtilis*
Clostridium sp., e.g. Clostridium
Corynebacterium
Desulfovibrio sp.
Diplococcus sp., e.g. *Diplococcus pneumoniae*
Escherichia sp., e.g. *Escherichia coli, Escherichia frenundii*
Flavobacterium sp.
Fungi
Klebsiella sp., e.g. *Klebsiella pneumoniae*
Mycobacterium
Nocardia sp.
Paracolobacterium sp.
Proteus sp., e.g. *Proteus morganii, Proteus vulgaris*
Pseudomonas sp., e.g. *Pseudomonas aeruginosa, Pseudomonas oleovorans*
Salmonella sp.
Sarcina sp.
Shigella sp.
Staphylococcus sp., e.g. *Staphylococcus albus. Staphylococcus aureus, Staphylococcus citreus*
Streptococcus sp.
Vibrio
Yeast In general, the iodine and bromine adducts of 1,3,5-tri($\beta$-hydroxy) ethylhexahydro-s-triazine are effective as bactericides against aerobic and anaerobic bacteria and against facultative anerobes.

A major use of the reaction products of iodine or bromine with 1,3,5-tri($\beta$-hydroxy) ethylhexahydro-s-triazine is as bactericides/fungicides in cutting oils, penetrating oils, grinding lubricants, iron tinning lubricants, core oils and hydraulic fluids. These oils, and particularly cutting oils, are employed in circulating systems, the oils being charged into the system and thereafter, desirably, not being replaced for a long period of time, for example, a year or more. Some of the bacteria and fungi above mentioned tend to degrade the oil over such an extended period of time rendering it less than fully effective for its intended purpose, for example, by breaking down the emulsion, inasmuch as cutting oils in addition to the basic oil that is employed also have present therein as a conventional matter a diluent such as water, a surfactant and a coupling agent, the cutting oil, as the term generically is employed, usually being an emulsion of oil-in-water. Moreover, some of the bacteria reduce sulfates present in the oil form sulfides which give rise to objectionable odors that are particularly noticeable after the cutting oils have been permitted to stand idle over a holiday or weekend. Other bacteria degrade the oil itself and still other bacteria may attack the object being cut or the cutting tool. Heretofore when the cutting oil has degraded sufficiently, it has been usual to drain the system and charge in a new batch of cutting oil. This is relatively expensive; that is to say, more expensive than the addition of an effective amount of a bactericide/fungicide which is able to maintain a low concentration of bacteria and fungi, in other words, low enough to prevent deterioration of the emulsion, the oil or the metal present.

Pursuant to the present invention, the reaction product of iodine or bromine with 1,3,5-tri($\beta$-hydroxy) ethylhexahydro-s-triazine is added to the cutting oil in an amount such that it is effective to control bacteria and fungi, holding them below amounts that are commercially deleterious. A typical amount of said reaction product is about 0.05% to about 0.1% by weight of the reaction product to the weight of the cutting oil emulsion.

The most desirable way of incorporating the novel bactericide/fungicide is to add the same to a cutting oil concentrate in an amount such that the finally diluted cutting oil will have the indicated concentration of the bactericide/fungicide. A typical cutting oil concentrate contains approximately 30% by weight of oil, surfactants and other addenda to which there is added the new bactericide/fungicide to form a base that is shipped to a customer. The customer then adds approximately 10 to 100 parts by weight of water to 1 part by weight of base, the preferred addition being 40 parts by weight of water.

The purpose of the present invention is not to formulate a new cutting oil concentrate or new cutting oil emulsion, exclusive of a bactericide/fungicide, but rather to use conventional cutting oil concentrates and conventional cutting oil emulsions in which there is present a reaction product of iodine or bromine with 1,3,5-tri($\beta$-hydroxy) ethylhexahydro-s-triazine as a novel bactericide/fungicide. By way of example, typical oils present in the cutting oil base are mineral lubricating oils. Another suitable oil is a naphthene base distallate oil, and another a mixed paraffin-naphthene base distallate oil. Naphthene base distallate fractions are quite useful because of their better emulsification properties and stability. One specific oil is a mixture of refined base oil fractions having an SUS at 100° F. between 70 and 800. Another proprietary cutting oil is sold by the Texas Company under the trade name Soluble Oil TL3337.

Typical surfactants, i.e. emulsifying agents, commonly used in conjunction with the oil in the cutting oil concentrate include soaps of petroleum sulfonic acids, naphthenic acids, fatty acids, rosin and tall oil, also oil-soluble metal petroleum sulfonates, alkali metal naphthanates and resinates, salts of fatty and carboxylic acids such as guanidine salts of high molecular weight, fatty acids and alkylolamine salts of carboxylic acids containing at least 10 carbon atoms, alkali metal salts of tall oil, Triton X100 and ethoxylated octyl phenol having 10 mols of ethyleneoxide. These soaps of salts usually are formed with sodium, but potassium also may be employed although it is somewhat more expensive. Mixtures of emulsifiers, for example, a mixture of sodium naphthanate and sodium petroleum sulfonate, a mixture of sodium resinate, sodium naphthanate and sodium petroleum sulfonate, and a mixture of guanidine stearate and triethanolamine stearate are particularly useful. As indicated previously, such emulsifying agents are conventional addenda for cutting oils. It is usual to have a total emulsifier concentration of between about 10% and about 20% by weight of the cutting oil concentrate, exclusive of water, with concentrations between 12% and 16% ordinarily being employed.

Another addendum for the cutting oil concentrate is a coupling agent. These improve the texture and stability of the cutting oil concentrate and of the cutting oil emulsion formed therefrom upon the addition of water. Typical coupling agents include mono and polyhydroxy alcohols, ether-alcohols and phenols. Examples of these compounds include ethyl, isopropyl, n-propyl, isobutyl, n-butyl and n-amyl alcohols; ethylene glycol, diethylene glycol and propylene glycol; ethylene glycol alkyl ethers wherein alkyl group has from 1 to 8 carbon atoms, for example ethylene glycol monoethylether (Cellosolve), ethylene glycol monoisopropylether, ethylene glycol monobutylether, ethylene glycol mono-n-pentylether, ethylene glycol mono-n-hexylether, diethylene glycol monoethylether (Carbitol), diethylene glycol monobutylether and cresol. The concentration of the coupling agent in the cutting oil concentrate, exclusive of water, usually is between about 0.1% and about 1.5% by weight. A particularly good coupling agent used in the cutting oil art is Cellosolve in a concentration of between about 0.6% and about 1% by weight of the cutting oil concentrate exclusive of the water.

Another conventional addendum is a rust inhibitor. Typical rust inhibitors are an amine, e.g. triethanolamine, and sodium nitrite. The quantity of the amine employed ranges up to 5%, and of the sodium nitrite up to 10%. Such inhibitors are useful where the cutting oil is used on ferrous products and usually is omitted where the cutting oil is used on non-ferrous products.

Where specific situations require other addenda, the same also may be employed inasmuch as the novel reaction product of iodine or bromine with 1,3,5-tri($\beta$-hydroxy) ethylhexahydro-s-triazine is inert to addenda employed in this field and, indeed, inert to all the carriers mentioned herein.

The reaction product of iodine or bromine in 1,3,5-tri($\beta$-hydroxy) ethylhexahydro-s-triazine acts as a compound in its bactericidal/fungicidal function. It does not appear to break down, i.e. the iodine or bromine do not appear to break away from said triazine adduct to achieve the desirable bactericidal/fungicidal effect.

Another use of the reaction product of iodine or bromine with 1,3,5-tri($\beta$-hydroxy) ethylhexahydro-s-triazine is as a bactericide/fungicide in hydraulic fluids. A preferred amount of said reaction product in a hydraulic fluid is about 0.5% by weight of the fluid. An effective range is from about 0.075% by weight to about 1% by weight of the hydraulic fluid. Inasmuch as the constitutions of hydraulic fluids are well known and form the subject of many patents and publications, it merely will be mentioned here that a typical hydraulic fluid includes a mineral oil and surfactants, a typical surfactant being a petroleum sulfonate. Examples of petroleum sulfonates useful for this purpose are the Petronates and Di-Petronates made by Sonneborn Division of Witco Chemical Company, Inc., and the Petrosuls manufactured by Pennsylvania Refining Co. Typical such petroleum sulfonates are Petronate L, Petronate HL, Petronate K, Petronate CR, Di-Petronate L, Di-Petronate HL, Di-Petronate K, Di-Petronate CR, Petrosul 742, Petrosul 745, Petrosul 454, Petrosul 750, Petrosul 550 and Petrosul 744LC. Also useful as surfactants in hydraulic fluids are the emulsifying agents mentioned above in connection with cutting oil emulsions. The hydraulic fluids also usually include water, the mix being about 60% by weight of the oil and emulsifying agent and about 40% by weight of water. The emulsion is of the water-in-oil type. It will be appreciated that the foregoing is simply by way of example. Many hydraulic fluids do not include natural oils but are formulated from synthetic lubricants. Frequently, and particularly in the case of low temperature usages, these fluids are anhydrous.

Another use of the reaction product of iodine or bromine with 1,3,5-tri($\beta$-hydroxy) ethylhexahydro-s-triazine is as a bactericide/fungicide in a household disinfectant or cleaner. Here, too, a typical disinfectant or cleaner formulation may be employed, except for omission of the bactericidal and/or fungicidal agent, along with an effective amount of the reaction product of iodine or brimine with 1,3,5-tri($\beta$-hydroxy) ethylhexahydro-s-triazine, the effective amount being for use as a bactericide/fungicide. A useful amount is 0.5% by weight of said reaction product in the disinfectant or cleaner. The balance of the disinfectant or cleaner will consist of water and the usual addenda. For example, in this balance there may be, depending upon the use to which the disinfectant or cleaner is to be put, about 10% of a surfactant-detergent such as an alkyl aryl sulfonate; one such excellent sulfonate is one where the alkyl fraction has from 12 to 13 carbon atoms. Lower amounts of the said reaction product can be employed effectively, for example, as little as 0.1% by weight of the total disinfectant or cleaner although it is preferred to have at least 0.2% by weight. Considerably more than 0.5% by weight may be employed although more is not ordinarily necessary to obtain the desired bactericidal/fungicidal effect. However, it has been observed that 3% by weight of the said reaction product is not irritating on patch tests so that such a high concentration and even a concentration as high as about 5% by weight can be employed although, as just pointed out, it is not desirable to use the same purely on an economic basis since a lower concentration is effective for the desired purpose.

Other suitable surfactants are a non-ionic surfactant which can be employed in an amount of about 2% by weight, a typical such surfactant being Tergitol 15S–12 which is a synthetic secondary alcohol containing 15 carbon atoms and 12 mols of ethyleneoxide. An alternate surfactant is a cationic surfactant, a satisfactory amount being in the range of 3% by weight. A typical such surfactant which is acceptable is a quaternarized polyethoxy tallow amine commercially known as Ethameen T–25, this being quaternarized with diethyl sulfate.

In addition to the foregoing, other conventional addenda may be employed in the cleaner, for instance, a thickener such, for example, as 2% by weight of alkanolamide or cocoa diethanolamide. As heretofore, in connection with the household disinfectant or cleaner, the specific constitution thereof is conventional except for the use therein of the reaction product of iodine or bromine with 1,3,5-tri($\beta$-hydroxy) ethylhexahydro-s-triazine as a bactericide/fungicide.

Still another use to which the reaction product of iodine or bromine with 1,3,5-tri($\beta$-hydroxy) ethylhexahydro-s- triazine can be employed as a bactericide/fungicide is in connection with soaps, either liquid or solid. An example thereof is a conventional bar soap with up to 3% by weight of a said reaction product incorporated therein prior to the formation of the bars. It will be appreciated that the same reaction products can be used with other types of soaps such, for instance, as soap flakes, soap beads, liquid soaps and liquid soap concentrates. The said bactericides/fungicides desirably can be employed in diluted form, e.g. in water, ethanol or propanol, in a 0.5% concentration, for entire body washing when it is desired to disinfect the skin for any reason, e.g. prior to surgical operations. In this and other uses, if desired, a higher concentration of the reaction product can be used, e.g. as much as 30% by weight based on the carrier.

Another use to which the novel reaction product can be put is as an inhibitor of mold growth for paints, where from about 0.1% to about 5% by weight can be used by incorporating the same into otherwise conventional paints as a fungicide. Typical paints into which the novel reaction product can be incorporated are water-base emulsion paints such as acrylic paints, vinyl paints, latex paints and alkyd paints, all being of the water emulsion type, and oil-base paints such, for instance, as linseed oil paint.

It is pointed out that the novel reaction product of the present invention can be safely used in these many compositions of matter because it is not toxic either when applied to the skin or ingested in small amounts. For example, the LD-50 of a 3% water solution of the reaction product of iodine or bromine with 1,3,5-tri($\beta$-hydroxy) ethylhexahydro-s-triazine with a 1:1 ratio of the iodine or the bromine to the triazine is less than 1 gram per kilogram of body weight when tested on rats. In view of the fact that said reaction product is used in low concentrations as indicated above, the amount of any one of the compositions of matter in which the reaction product has been incorporated that would have to be swallowed for adverse side effects from the reaction product to ensue would have to be so large as to be incapable, as a practical matter, of ingestion due to the very large amount of the carrier that would have to be swallowed and, indeed, it is unlikely that an adult or child would be able to retain an amount of carrier, without regurgitation, which contains an undesirable amount of the reaction product.

The following results were noted in connection with tests performed with the addition of the reaction product of iodine with 1,3,5-tri($\beta$-hydroxy) ethylhexahydro-s-triazine to the indicated carriers. The concentration and results are listed; the iodine was present in the reaction product in an amount equal to 10% by weight of said product:

1000 p.p.m.: inhibitory against all bacteria and fungi for 84 days in Trim Regular.
1000 p.p.m.: inhibitory against all bacteria and fungi for 84 days in Citgo coolant.
1000 p.p.m.: inhibitory against all bacteria and fungi for 77 days in Vantrol.
1000 p.p.m.: inhibitory against all bacteria and fungi for 91 days in Sun Seco.
1000 p.p.m.: inhibitory against all bacteria and fungi for more than 98 days in Norton Wheelmate.
1000 p.p.m.: inhibitory against all bacteria and fungi for more than 98 days in Chemtool.
1000 p.p.m.: inhibitory against all bacteria and fungi for more than 98 days in Monroe Primecut.
1000 p.p.m.: inhibitory against all bacteria and fungi for more than 98 days in Lusol 1-40 oil to water ratio.

It thus will be seen that there are provided compounds, compositions and methods which achieve the various objects of the invention and which are well adapted to meet the conditions of practical use.

As various possible embodiments might be made of the above invention, and as various changes might be made in the embodiments above set forth, it is to be understood that all matter herein described is to be interpreted as illustrative and not in a limiting sense.

Having thus described the invention there is claimed as new and desired to be secured by Letters Patent:

1. A composition useful as a bactericide or fungicide, said composition comprising a carrier and a bactericidally or fungicidally effective amount of iodine or bromine fully reacted at between about 30° C. to about 80° C. with 1,3,5-tri($\beta$-hydroxy) ethylhexahydro-s-triazine to form a reaction product having the formula

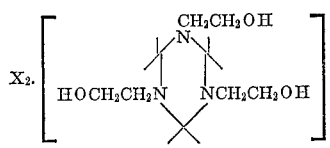

where X is iodine or bromine.

2. The composition as set forth in claim 1 wherein the product is present in an amount of from about 0.05% to about 30% by weight of the carrier.

3. The composition as set forth in claim 2 wherein the carrier is water.

4. The composition as set forth in claim 2 wherein the carrier is ethanol.

5. The composition as set forth in claim 2 wherein the carrier is propanol.

6. A method of protecting a substrate subject to attack by bacteria or fungi, said method comprising applying to the substrate a bactericidally or fungicidally effective amount of iodine or bromine fully reacted at between about 30° C. to about 80° C. with 1,3,5-tri($\beta$-hydroxy) ethylhexahydro-s-triazine to form a reaction product having the formula

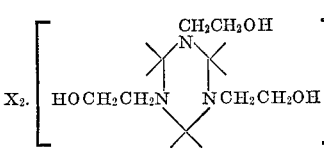

where X is iodine or bromine.

References Cited
UNITED STATES PATENTS
3,624,252  11/1971  Labarge _____ 424—249

OTHER REFERENCES

Smolin et al., "The Chem. of Heterocyclic Cmpds," Interscience Pub. (1959), p. 486–488.

VINCENT D. TURNER, Primary Examiner

U.S. Cl. X.R.

106—15 AF; 252—51.5 R, 107; 260—45.8 N, 248 NS